United States Patent

Puckette

[15] 3,654,390

[45] Apr. 4, 1972

[54] SYNCHRONIZER FOR SEQUENCE GENERATORS

[72] Inventor: Charles M. Puckette, Scotia, N.Y.

[73] Assignee: General Electric Company, Schenectady, N.Y.

[22] Filed: Mar. 16, 1970

[21] Appl. No.: 19,904

[52] U.S. Cl. ..........................178/69.5 R, 307/269, 328/155

[51] Int. Cl. ..........................H04b 1/16

[58] Field of Search.................178/69.5 R; 179/15 BS, 15 A; 328/155; 307/221, 269

[56] References Cited

UNITED STATES PATENTS

| | | | |
|---|---|---|---|
| 3,432,619 | 3/1969 | Blasbalg | 179/15 A |
| 3,537,013 | 10/1970 | Feldman | 307/269 |
| 3,546,592 | 12/1970 | Mayo | 178/69.5 |
| 2,540,167 | 2/1951 | Houghton | 178/69.5 |
| 3,401,339 | 9/1968 | Kluever et al | 178/69.5 |
| 3,447,085 | 5/1969 | De Haas et al | 178/69.5 |

*Primary Examiner*—Richard Murray
*Assistant Examiner*—Peter M. Pecori
*Attorney*—John F. Ahern, Paul A. Frank, Julius J. Zaskalicky, Frank L. Neuhauser, Oscar B. Waddell and Joseph B. Forman

[57] ABSTRACT

A synchronizer for two maximum length sequence generators is disclosed wherein a digital, time varying filter is used to compare the two sequences. The generator used to generate one of the sequences is modified by the output of the filter to change the sequence generated thereby. When the output of the filter indicates a predetermined, minimum amount of disagreement between the two sequences, the modification of said one of the sequence generators is terminated and the two sequences are synchronized to a predetermined degree. The amount of disagreement allowed may be tailored to suit conditions under which the synchronizer must operate.

6 Claims, 3 Drawing Figures

Inventor:
Charles M. Puckette
by Paul A. Frank
His Attorney.

SYNCHRONIZER FOR SEQUENCE GENERATORS

This invention relates to a control loop for synchronizing two signals and, in particular relates to a synchronizer for two maximum length sequence generators.

In the testing of digital communication systems, there are several performance indices which may be used to indicate how well the system is performing its assigned task. There is, however, one performance index that is more definitive than the others that can be used as a system figure of merit. This performance index is the system error rate.

In order to determine the system error rate, a count is made of the number of errors made when random digital data is transmitted through the system. One source of random digital data is what is known as a maximum length sequence generator. The output of the generator is a series of logic ones and zeros which may be used directly as an input to the data communication system. The received data will then be a delayed version of the transmitted sequence, corrupted by whatever errors occur during transmission.

When the error rate is fairly low, it is relatively easy to synchronize a reference maximum length sequence generator to the received signal. The errors are counted and the system error rate is then determined.

When the error rate is fairly high, however, the synchronization process becomes much more difficult. Further, when the transmitted data is every second, third, or fourth bit of the sequence generators output, so as to scramble or de-correlate the data, the synchronization process becomes rather formidable since only samples of a sequence are transmitted and not the whole sequence.

Presently available equipment uses sequence generators as data sources and synchronizes a reference sequence generator with the received data stream. The technique used to synchronize the reference generator with the received sequence is to take the received sequence and transfer it to the shift register used in the reference generator. When the register is "loaded" with a portion of the received sequence, control logic inhibits the data input, and starts the reference generator with the initial conditions necessary for proper synchronization.

This approach yields quick synchronization but suffers from false synchronization when errors are contained in the received sequence. Likewise, if the delay through the transmission system changes, the two sequences will no longer be aligned. There is no way to automatically detect the synchronization error and re-synchronize the sequences. Further, this technique will not work at all if the transmitted data is a sampled version of the sequence.

It is, therefore, an object of the present invention to provide a synchronizing apparatus capable of synchronizing two signals even when one contains a large amount of erroneous information.

It is a further object of the present invention to provide a synchronizing system capable of synchronizing two signals even though one signal contains scrambled or sampled information.

It is a further object of the present invention to provide synchronizing apparatus wherein the degree of synchronization may be adjusted to suit conditions.

Another object of the present invention is to provide synchronizing apparatus using a time variable matched filter.

The foregoing objects are achieved in the present invention wherein there is provided a pair of N-stage shift registers, the input to one being the received signal and the input to the other being a locally generated signal. Each stage of one register is compared with the corresponding stage of the other shift register via a digital comparator. The outputs of the comparators are summed in a digital adder which, in turn, has its output coupled to a threshold detector. The threshold detector controls an inhibit circuit connected between a clock generator and the local sequence generator. The combination of shift registers, comparators, and digital adder act as a correlator for the two sequences. The threshold detector, which is variable, determines the amount of correlation necessary between the two sequences before the locally generated sequence is no longer altered.

The synchronization process involves phase shifting the output of a local maximum length sequence generator in order to synchronize or align it with the received sequence. Since the sequence generator comprises a shift register and logic gates, the desired phase shift is achieved by blocking one shift transition pulse from the sequence generator's clock. The phase shift can be unidirectional since the sequences are periodic. This results in considerable saving in the complexity of the synchronizing apparatus necessary.

A fundamental feature of the process is deciding when the two sequences are out of phase. This decision is made by the correlator and threshold detector. Proper design of the correlator, which acts as a time variable matched filter, enables the two sequences to be aligned even if the received sequence is severely distorted by noise or other error producing processes. The design of the correlator/filter is more fully described below.

A more complete understanding of the present invention may be obtained by a consideration of the following detailed description in conjunction with the attached drawings in which.

Figure 1:
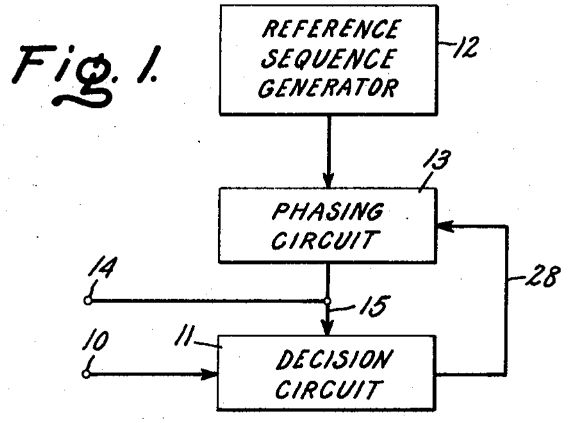
FIG. 1 is a block diagram of the basic operation of the present invention.

Referring to FIG. 1 there is illustrated a block diagram indicating the basic operation of the present invention. The received pulse sequence from the data transmission system to be evaluated is applied to input terminal 10 of decision circuit 11. Reference sequence generator 12 has its output applied by a phasing circuit 13 to input 15 of decision circuit 11. Decision circuit 11 basically decides how alike the two pulse sequences are and, depending upon the degree of similarity, adjusts phasing circuit 13 so as to increase the likeness between the two pulse sequences. The pulse sequence produced by generator 12, once adjusted, is then in synchronism with the received pulse sequence and is available at output terminal 14. The over-all operation of the present invention may thus be summarized as two basic functions, namely, the decision as to whether or not the two pulse sequences need to be adjusted relative to one another to achieve better synchronism and, secondly, the adjustment procedure itself.

Figure 2:
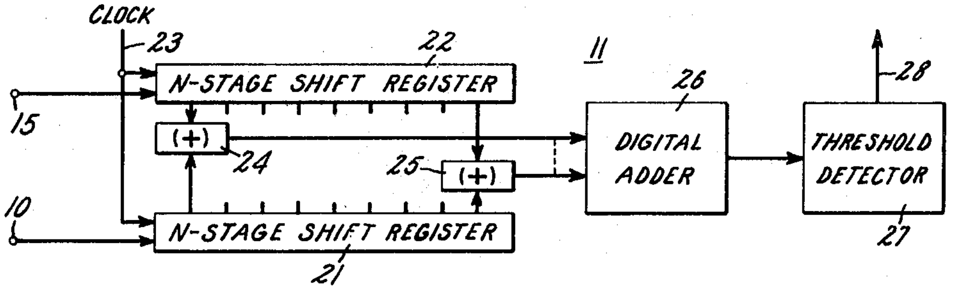
FIG. 2 is a more detailed illustration of the present invention, showing the matched filter-correlation in detail.

In FIG. 2 there is illustrated a specific form of the decision circuit 11 as illustrated in FIG. 1. In FIG. 2 the received pulse sequence is applied to input terminal 10 of one N-stage shift register 21. The locally generated reference pulse sequence is applied to a second N-stage shift register 22 by way of input terminal 15. The N-stage shift registers 21 and 22 have an additional input, namely, clock input 23. As each sequence is stored in the respective N-stage shift registers, the output of each individual stage is compared by a plurality of comparison means illustrated in exemplary fashion in FIG. 2 by comparators 24 and 25. Digital comparators 24 and 25 produce a logic "1" output if their respective inputs are not alike. That is, if, for example, the particular stage in register 22 is a logic "1" and the corresponding stage in register 21 is a logic "0" or vice versa, then comparator 24 will produce a logic "1" output signal. If the inputs to comparator 24 are either both logic " 0's" or logic "1's," then the output signal from comparator 24 is logic "0." Digital comparator 25 operates in a similar manner. Digital adder 26 serves to combine the output signals from all the comparators and applies this combined signal to threshold detector 27. The threshold detector 27 may be adjusted to produce an output signal at terminal 28 for any desired level of input signal. Since the output of digital adder 26 is essentially a signal indicative of the amount of disagreement between the patterns stored in shift registers 21 and 22, threshold detector 27 could, for example, be set to trigger upon three disagreements. However, if communication conditions dictated it, the threshold detector could be adjusted to trigger upon a much higher or a lower amount of disagreement.

Thus, it can be seen that N-stage shift registers 21 and 22 and the comparators exemplified by elements 24 and 25 serve to compare the pulse sequences received at the respective input terminals. Digital adder 26 serves to combine the outputs of the comparators and produces a composite output signal indicative of the amount of disagreement between the two pulse sequences. Threshold detector 27 is adjusted to provide an output signal on line 28 only when the amount of disagreement exceeds a predetermined level. This output signal from the threshold detector 27 serves to activate phase adjusting circuit 13 as illustrated in FIG. 1. It may be noted that the shift registers and comparators act as a digital filter whose characteristics are time varying in the sense that the filter characteristics depend upon the relative phases of the two pulse sequences to be synchronized. By properly selecting the threshold on the correlation between the two sequences by way of threshold detector 27, it is possible to position the two sequences so that the correlation is at a maximum. When this occurs, the two sequences are properly synchronized.

The length of the N-stage shift registers is a design variable that can be selected so that synchronization or "lock" will occur even though the received sequence is highly corrupted by errors. The number of stages of the particular shift register, that is the value of N, may be calculated on the basis of a desired probability of unlock-given lock for a specified channel bit error rate, and a specified threshold level. Assuming a maximum likelihood decision rule, the probability of unlock-given lock is $$p\,(\text{unlock/lock}) \leq 4(pq)^{N/2} \qquad (1)$$

where $P$ is the probability of unlock-given lock, $p$ is the channel bit error rate, $q$ is equal to $(1\text{-}p)$, and $N$ is the number of bits. If the channel bit error rate is 0.01 and the desired probability of unlock-given lock is $10^{-8}$, a suitable value of $N$ is 16. Thus, a 16-stage shift register would be suitable for this application.

There are two errors which the decision circuit can make. One is that it can indicate that the two sequences are synchronized when they are not and thereby not initiate any phase adjustment. The second error that the decision circuit can make is far more serious; that is, the decision circuit can indicate that the two sequences are not in synchronism when they actually are. If this occurs, then the two sequences will be put out of synchronism and will remain out for a number of periods of the sequence. By determining the length of the shift register in accordance with equation (1) and selecting the value of the threshold at which threshold detector 27 produces an output signal, the desired probability of unlock-given lock may be obtained. Thus, the second type of error as noted above will be minimized to a value predetermined by the user of the apparatus.

Figure 3:
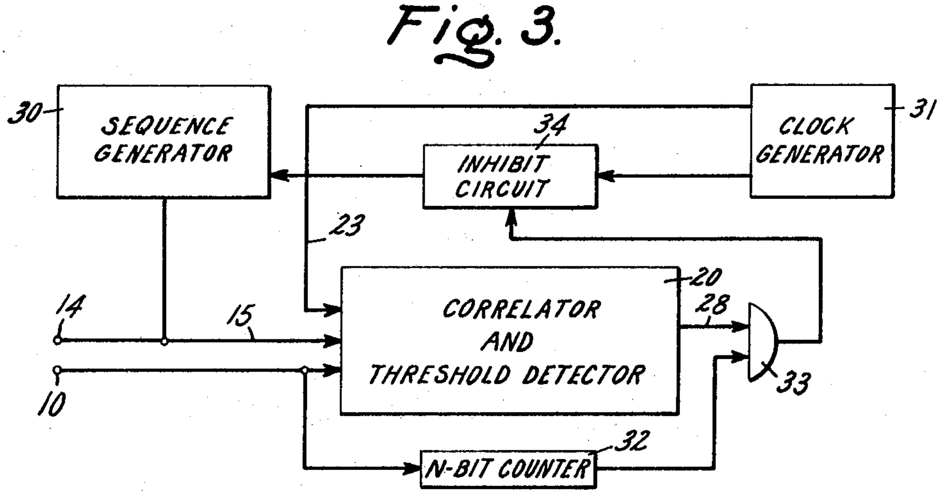
FIG. 3 illustrates the control circuitry of the present invention.

A control circuit showing the operation of the present invention in a phase locked loop type circuit is illustrated in FIG. 3. As with the other figures the received pulse sequence is applied at input terminal 10 and is one input to correlator and threshold detector circuit 20. The locally generated pulse sequence is produced by sequence generator 30 and is applied over line 15 as a second input to correlator and threshold detector circuit 20. A clock signal is produced by clock generator 31 and applied as a third input to correlator and threshold detector 20 by way of line 23. Correlator and threshold detector 20 comprises N-stage shift registers 21 and 22, the comparators exemplified by comparators 24 and 25, digital adder 26, and threshold detector 27. Correlator and threshold detector 20 compares the received and locally generated pulse sequences and produces an output signal on line 28 indicative of whether or not the pulse sequences are synchronized. This output signal is applied as one input to AND gate 33. The other input to AND gate 33 is from an N-bit counter 32 which counts the bits from the received pulse sequence and produces an interrogation pulse at the end of each N-bit portion of the received pulse sequence. The simultaneous presence of an interrogation pulse and signal indicative of the fact that the two sequences are not in synchronism will trigger AND gate 33 to produce a pulse which activates inhibit circuit 34. Inhibit circuit 34 is connected between clock generator 31 and sequence generator 30. Since the generation of a pulse sequence is dependent upon the presence of clock pulses as an input to the sequence generator, when inhibit circuit 34 is activated, one pulse of the clock pulses will be prevented from reaching sequence generator 30, thereby retarding the sequence produced by sequence generator 30 one period of the clock signal. By steadily retarding the locally generated pulse sequence, the locally generated pulse sequence and the received pulse sequence can be made to coincide. Since the received pulse sequence is periodic, this unidirectional phase shifting is permissible and there is no need for error polarity information. An additional benefit is the fact that phase shift is accomplished very easily by inhibiting one shift in sequence generator 30. Thus, the phase shift circuit is a clock inhibit circuit which blocks one cycle from clock generator 31 every time a phase shift command is received from AND gate 33.

One using the present invention to determine the error rate of a data transmission system would apply the locally generated pulse sequence as one input to the synchronizing apparatus, the received pulse sequence from the data transmission system as a second input to the synchronizing apparatus and wait for an indication that the two sequences are synchronized. Once this indication is obtained, the number of disagreements between the locally generated pulse sequence and the received pulse sequence may be counted over a given period of time thus providing the user with the error rate of the data transmission system. An indication of the fact that the two sequences are synchronized may readily be obtained from the correlator and threshold detector itself or from AND gate 33. For example, the lack of an output signal by AND gate 33 for a number of consecutive interrogations would indicate that the pulse sequences are synchronized.

Having thus described my invention, it will be obvious to those skilled in the art that various modifications may be made within the spirit and scope of the present invention. For example, comparators 24 and 25 may comprise modulo-2 adders or any other circuitry that will provide an output upon dissimilar input signals being received. Further, while a filter-correlator described in FIG. 2 is described relative to an indication of the amount of disagreement between two pulsed sequences and suitably activating a threshold detector when the number of disagreements exceeds a predetermined value, it is obvious that the converse of this system may also be employed. That is, comparator gates 24 and 25 may comprise gates that produce a logic "1" output only when the inputs are alike. The threshold detector would then be deactivated by the input signal thereto exceeding a particular value.

What I claim as new and desire to secure by Letters Patent of the United States is:

1. Synchronizing apparatus for synchronizing a locally generated pulse sequence with another pulse sequence, each sequence comprising a pattern of logic ones and zeroes, comprising:

digital matched filter means comprising a first shift register having characteristics variable under the control of said local pulse sequence, a second shift register for receiving said other pulse sequence, and an output derived from said shift registers threshold detector means, coupled to said output of said matched filter means, for sensing when the output of said matched filter exceeds a predetermined value, and control means coupled to said threshold detector means, for adjusting the phase of said locally generated sequence with respect to said other sequence in response to said threshold detector means.

2. Synchronizing apparatus as set forth in claim 1 wherein said matched filter means comprises:

first and second N-stage register means, said first N-stage register means receiving said locally generated sequence and said second N-stage register means receiving said other sequence, a plurality of comparison means connected between respective stages of said first and second N-stage registers for determining whether the counts in the respective stages are the same and producing an output signal in accordance therewith, combining means for combining said output signals and producing a resultant signal, and means coupling said resultant signal to said threshold detector means whereby, depending upon the amount of agreement between said registers, the phase adjustment of said locally generated sequence is permitted to continue or is terminated in accordance with the decision made by the threshold detector.

3. Synchronizing apparatus as set forth in claim 2 wherein said plurality of comparison means comprises:

N-comparison means coupled one each to each of the respective stages of said first and second N-stage register means.

4. Synchronizing apparatus as set forth in claim 2 wherein said comparison means comprises:

modulo-2 adding means for producing a logic "1" output signal when the counts in the respective stages of said first and second N-stage registers are not the same and a logic "0" when they are the same.

5. Synchronizing apparatus as set forth in claim 1 wherein said locally generated pulse sequence is produced by a sequence generator driven by a source of clock pulses and said control means comprises:

inhibit circuit means, coupled between said source of clock pulses and said sequence generator, for preventing clock pulses from reaching said sequence generator whereby the sequence produced by said sequence generator is retarded by one period of the clock signal.

6. Synchronizing apparatus as set forth in claim 5 further comprising:

gate means interposed between said threshold detector means and said inhibit circuit means, and N-bit counter means coupled to receive said other pulse sequence for producing an interrogation pulse for every N th bit in said other sequence, said interrogation pulse being coupled to said gate means for enabling said gate to pass the output signal from said threshold detector means to said inhibit circuit means.

* * * * *